May 28, 1929.  G. KLEINBERG  1,715,297
DEVICE FOR MOLDING COMBUSTIBLE EGGETTES
Filed Oct. 20, 1927  2 Sheets-Sheet 1

Inventor
Gustave Kleinberg,
by H. B. Wilson & Co.
Attorneys

May 28, 1929.　　　G. KLEINBERG　　　1,715,297
DEVICE FOR MOLDING COMBUSTIBLE EGGETTES
Filed Oct. 20, 1927　　　2 Sheets-Sheet 2
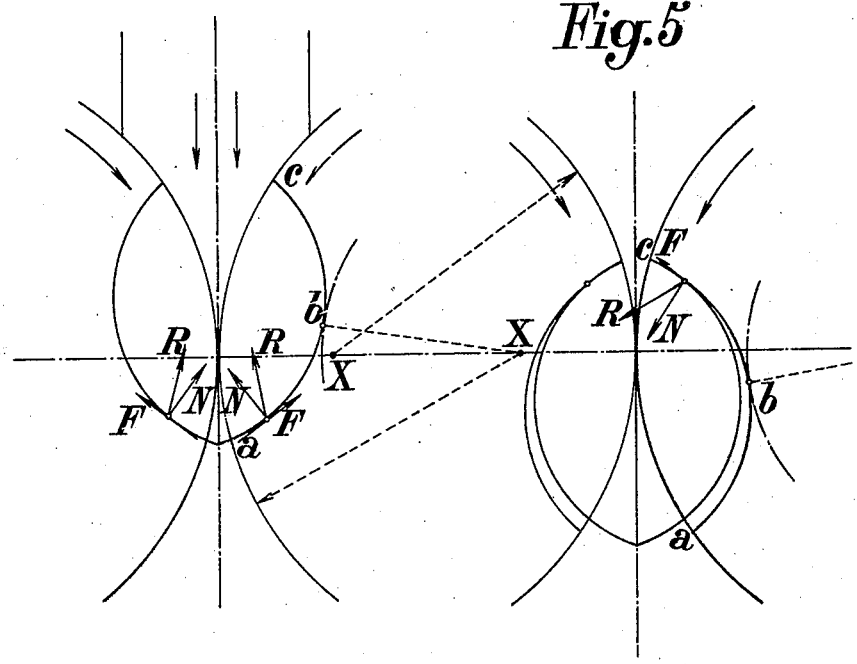

Patented May 28, 1929.

1,715,297

UNITED STATES PATENT OFFICE.

GUSTAVE KLEINBERG, OF LA ROCHELLE, FRANCE.

DEVICE FOR MOLDING COMBUSTIBLE EGGETTES.

Application filed October 20, 1927, Serial No. 227,586, and in France October 30, 1926.

My invention relates to improvements in machines for molding combustible eggettes and more particularly to the presses thereof constituted by rotary drums provided with molding recesses.

One object of the invention is to provide molding cavities of special section with a view to increasing the thickness of the eggettes and to improve compression thereof whereby the amount of combustible necessary to form the said eggettes is reduced.

A more specific object of the invention is to provide molding cavities for the said drums whose shape is in the form of a curve intersecting the cylindrical surface of said drum at unequal angles for accomplishing the results, above pointed out.

Other objects of the invention will be obvious to those skilled in the art with reference to the accompanying drawing in which—

Fig. 4 is an explanatory diagram of my improved drums;

Fig. 5 is another explanatory diagram thereof;

Fig. 6 is still another explanatory diagram thereof; and

Fig. 7 is still another explanatory diagram thereof.

The thinner the agglomerated coal eggette, the more easily it is removed from the mold, that is to say, shallower molding recesses enhance removal of the eggette therefrom.

Easy removal from the mold results in an appreciable economy in agglomerating material, but the use of cavities of small depth reduces the hour output of the machine. If it is desired to use deep recesses, it is essential that the two halves of the agglomerated eggette, during the compression, should be sufficiently welded together in order that they should not separate upon removal from the mold owing to the tendency of each of them to adhere to the wall of the molding cavity. For obtaining the union upon molding, it is therefore necessary to use large proportions of agglomerating material; but the use of fusible agglomerating materials, such as pitch mixed with a small proportion of coal tar, does not always give satisfactory results with deep recesses, as these agglomerating materials do not harden rapidly enough to obtain a perfect union at the time of compression. The hardening of such eggettes is produced only when they are cooled.

My invention permits the molding of thick eggettes and overcomes the disadvantages, above mentioned, assuring a high hour output and considerable economy in agglomerating material.

Figure 1:
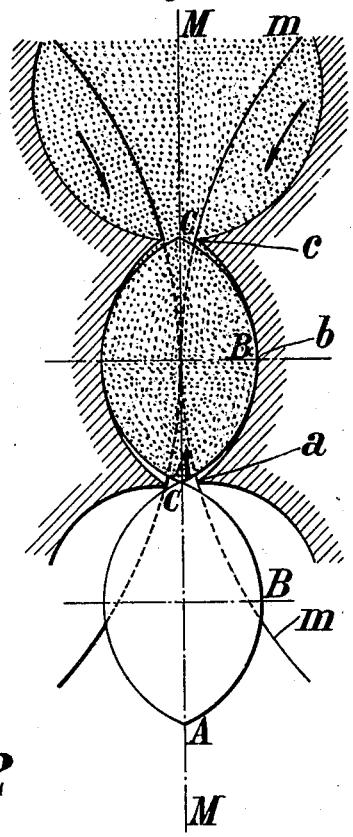
Fig. 1 is a sectional view through a portion of a pair of drums along a transverse plane illustrating the disadvantages of the molding cavities at present used;

Referring to Fig. 1, machines are known in the art in which drums have molding cavities where the bottom has a curved shape at the place of the greatest section through a plane perpendicular to the axes of rotation of the drums of the machine, having the same curvature at the inlet as at the outlet. The drums rotate in the direction of the arrows and the inlet is at $c$ and the outlet at $a$.

If the molding of a continuous chain of eggettes is effected by means of the cavities arranged in the same cross section of the drums, the eggettes formed may be compared to a rack having a double set of teeth, each set of teeth meshing with the corresponding set of teeth of a drum. This chain of eggettes is usually obtained by causing a support such as wire gauze to pass between the drums.

The wire gauze is represented by the line M—M of the rack and rolls without sliding on the pitch circle of the toothed wheel represented by the molding drum, that is to say on the cylindrical surface $m\ m$ of this drum, and the curves $a\ b\ c$ and A B C have, when in mesh, common tangents common at their points of contact. It will then be easily seen that, at these points of contact, the two associated curves (the cavity and the surface of the eggette) slide relatively to each other, as in all gears. It is not the curve ABC which unrolls without sliding on the curve $abc$, but the line M—M which rolls on the pitch circle $m\ m$. The traces of this sliding movement can be easily noticed on the surface of the eggettes obtained.

Further examination reveals that the eggette advances in a vertical direction relatively to the recess which has formed it. The friction, which results from the sliding movement between the two surfaces, produces therefore, on the eggette, a stress directed upwardly in the direction of the tangent to the curve ABC at the contact point with its associated curve $abc$ at the precise moment of removing from the mold, these friction stresses exerted on the two eggette halves have horizontal components opposed to the compression stress, and increasing, as the angle between this curve at the point of contact and the vertical approaches 90°. These stresses tend therefore to separate the two eggette halves immediately at the beginning of removal from the mold. For avoiding this separation, it is therefore necessary that the horizontal component of the friction stress exerted on the surface of the eggette should be small. This is obtained by joining the surface $ab$ of the cavity to the cylindrical surface of the molding drum at a relatively small angle.

Figure 2:
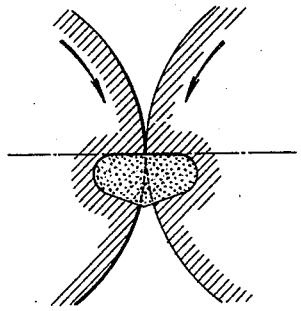
Fig. 2 is a fragmentary sectional view illustrating a detail of Fig. 1.

The shape of the molding cavities in current use is symmetrical relative to a radius of the drum passing through the point $b$ which is the point nearest the axis of rotation of the molding drum. It results therefrom that if the entrance angle is small, the outlet angle is equal thereto and the eggette obtained is flat. A glance at Fig. 2 will reveal that removal from the mold of thick eggettes formed with molding cavities of usual construction is impossible.

The portion $bc$, however, of the cavity causes by its friction on the surface of the eggette a compression stress and this portion of the curve may be disposed at a suitable angle to the surface of the molding drum for facilitating removal from the mold. It is possible for this angle to attain 90 degrees.

Figure 3:
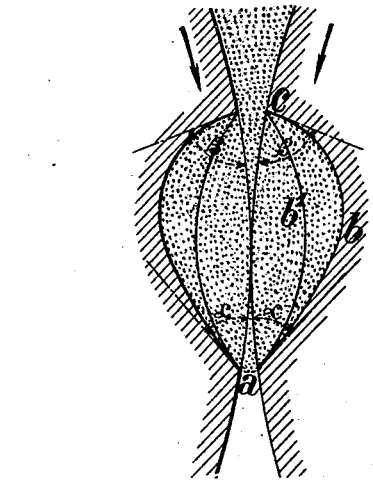
Fig. 3 is a fragmentary transverse sectional view of a pair of drums provided with my improved molding cavities;

Referring to Fig. 3, eggettes formed in accordance with my invention whether of thick section represented by the line $abc$ or of thinner section represented by the line $ab^1c$ are removed from the mold with great facility.

My improved cavities are provided with junction angles between the lateral surface of the molding drum and the curve of greatest section in the bottom of the cavity along a transverse plane perpendicular to the axis of rotation of the drum such that the outlet angle $\alpha$ is smaller than the inlet angle $\beta$ with the drums rotating in the direction of the arrows. Obviously the section of the cavities along a radial plane may be of any form.

The advantages of such an arrangement as regards the compression of the eggettes will now be pointed out with reference to Figs. 4 to 7.

At the time of compression, the reaction R (Fig. 4) exerted by the wall of the cavity on the eggette half formed thereby is the resultant of the normal pressure N at the point of contact and of the friction F directed upwardly according to the tangent to the curve $abc$. As long as the point $b$, that is to say the point of the recess nearest the axis of rotation of the molding drum, has not reached the line of the centers XX of the drums, the reactions R are directed obliquely and upwardly. If the lower portion $ab$ of the cavity receives an excess of material, this excess is partly driven back towards the top of the cavity. Conversely, in the upper portion $bc$ of the cavity (Fig. 5), the resultant R is usually slightly inclined downwardly, and the excess of material cannot escape. The material is retained in this portion of the cavity and it results therefrom that the compression in the upper part of the cavity is greater than in the lower part. This over compression in the upper portion of the eggette is proportional to the ratio of the surface $(s+t)$—Figure 6—to the surface $t$. In fact, during the compression, the volume represented by the surface $s+t$ is reduced to that represented by $t$. Now, the material for forming eggettes always traps air and a small quantity of water vapour which are compressed during the molding and escape at the time of taking from the mold and crack the eggette if this compression is too high. This effect is noticeable on suitably compressed eggettes; the upper portion, that is to say, that which has been subjected to an excess of compression, is cracked. For avoiding this disadvantage, which is particularly marked when the cavities are flat and long in the circumferential direction, it suffices to provide, in the upper part of the cavity, a reservoir permitting to absorb the excess of material which is present at this place and to thus limit the overcompression to a permissible value. The eggettes which are thick in the upper part and tapered at their lower part are thus obtained, which is the object of the invention.

The ratio $\frac{s+t}{t}$, in fact, grows as the upper part of the cavity (part situated above the line of the centers of the molding drums (Fig. 7) grows deeper and shorter. In other words, for avoiding an excess of compression at the upper part of the ovoid agglomerate, it is necessary to lengthen the lower part to the detriment of the upper part, or, what is the equivalent, to expand the upper part to the detriment of the lower part. The compression is thus more regular, so that the recesses can be sufficiently filled (by suitably opening the material feeding channel and by a sufficient load on the distributor) for obtaining thick eggettes suitably compressed in all their portions and without cracks at their upper point. The result of proper compression is reduction in quantity of the agglomerating material for forming the eggettes.

What I claim as my invention and desire to secure by Letters Patent is:

1. In a machine for forming combustible eggettes, a plurality of rotary molding drums and means associated with said molding drums for exerting more pressure on the upper portion of the eggette formed thereby than on the lower portion thereof with respect to the direction of rotation of said drums.

2. In a machine for forming combustible eggettes, a plurality of rotary molding drums and a plurality of curved surfaces intersecting the cylindrical surface of said drums at unequal angles for exerting more pressure on the upper portion of the eggette formed thereby than on the lower portion thereof with respect to the direction of rotation of said drums.

3. In a machine for forming combustible eggettes, a plurality of rotary molding drums and a plurality of molding cavities formed in said drums, said molding cavities being of such a shape that a transverse section therethrough perpendicular to the axis of rotation of said drums shows a curve intersecting the cylindrical surface of the drum at unequal angles.

4. In a machine for forming combustible eggettes, a plurality of rotary molding drums and a plurality of molding cavities formed in said drums, said molding cavities being of such a shape that a transverse section therethrough perpendicular to the axis of rotation of said drums shows a curve intersecting the cylindrical surface of the drum in such wise that the outlet angle is smaller than the inlet angle with respect to the direction of rotation of said drums.

In testimony whereof I have signed my name to this specification.

GUSTAVE KLEINBERG.